(12) United States Patent
Aoki et al.

(10) Patent No.: US 7,318,161 B2
(45) Date of Patent: Jan. 8, 2008

(54) ENCRYPTED FILE RETRIEVAL METHOD AND DEVICE AND COMPUTER-READABLE RECORDING MEDIUM

(75) Inventors: Kazuhiko Aoki, Tokyo (JP); Tomohiro Hamada, Tokyo (JP)

(73) Assignee: NEC Corporation, Tokyo (JP)

( * ) Notice: Subject to any disclaimer, the term of this patent is extended or adjusted under 35 U.S.C. 154(b) by 743 days.

(21) Appl. No.: 09/962,074

(22) Filed: Sep. 26, 2001

(65) Prior Publication Data
US 2002/0037082 A1    Mar. 28, 2002

(30) Foreign Application Priority Data
Sep. 28, 2000    (JP) ............................. 2000-295725

(51) Int. Cl.
*G06F 11/30* (2006.01)
*G06F 12/14* (2006.01)
*G06F 7/00* (2006.01)

(52) U.S. Cl. ........................... 713/193; 707/3; 707/101
(58) Field of Classification Search ................ 713/165, 713/193; 707/3, 101
See application file for complete search history.

(56) References Cited

U.S. PATENT DOCUMENTS

| | | | |
|---|---|---|---|
| 4,375,579 A | | 3/1983 | Davida et al. |
| 4,827,508 A | * | 5/1989 | Shear .......................... 705/53 |
| 5,212,639 A | * | 5/1993 | Sampson et al. .............. 705/30 |
| 5,991,755 A | * | 11/1999 | Noguchi et al. ................ 707/3 |
| 6,587,849 B1 | * | 7/2003 | Mason et al. ................... 705/5 |

FOREIGN PATENT DOCUMENTS

| | | |
|---|---|---|
| CN | 1229218 A | 9/1999 |
| JP | 2000-11001 | 1/2000 |
| WO | WO 00/31964 | 6/2000 |

OTHER PUBLICATIONS

D. Song et al., "Practical techniques for searches on encrypted data", Security and Privacy , 2000. S&P 2000. Proceedings. 2000 IEEE Symposium on Berkeley, CA USA May 14-17, 2000, Los Alamitos, CA, USA, IEEE Comput. Soc, US, May 14-17, 2000 pp. 44-55.

* cited by examiner

*Primary Examiner*—Kambiz Zand
*Assistant Examiner*—Christopher J Brown
(74) *Attorney, Agent, or Firm*—Young & Thompson

(57) ABSTRACT

An encrypted file is constituted by an assemblage of records having a plurality of items, and at least key items among the plurality of items that are keys in a retrieval are encrypted. The expansion means of a retrieval device decrypts at least key items of each record of the encrypted file, attaches identifiers that indicate which records the key items belong to, and expands the decrypted key items and identifiers in a work area of a main memory. A retrieval means retrieves from the work area key items that satisfy retrieval conditions that are applied by the user, reads the appropriate original records from the encrypted file if retrieval succeeds, decrypts the records, and presents them to the user.

12 Claims, 7 Drawing Sheets

ENCRYPTED FILE RETRIEVAL METHOD AND DEVICE AND COMPUTER-READABLE RECORDING MEDIUM

BACKGROUND OF THE INVENTION

1. Field of the Invention

The present invention relates to file retrieval, and more particularly to a method and a device for retrieval of an encrypted file storing encrypted data.

2. Description of the Related Art

With the popularization of the Internet, a multitude of various types of information are provided on the Internet. However, for entities that offer information, there is the security risk that information that should not be offered, such as personal information or company information, will be leaked onto the Internet or stolen. Techniques exist for encrypting database files as a safeguard against leaks or theft. Nevertheless, the information of a database file must still be provided to members who need the indispensable information within a company, and techniques are necessary for retrieving encrypted files.

The most basic retrieval method for an encrypted file is to decrypt all of the encrypted file data content, store the decrypted data in another database file of the same structure, and then retrieve the decrypted data from this file. This method will be referred to hereinbelow as the first method of the prior art.

Another method of retrieval of an encrypted file is described in Japanese Patent Laid-open No. 11001/2000. In this prior-art method, an encrypted file is retrieved by encrypting a retrieval keyword that has been inputted as normal text. In more concrete terms, a plurality of files that have been encrypted beforehand are decrypted, sets of keywords contained in each file and file names in which the keyword was contained are extracted, and an index is generated in which the keywords in each set are encrypted. For example, if the keyword "Suzuki Ichiro" is contained in a particular file A, a set is generated containing the encrypted data of "Suzuki Ichiro" and the name of file A. The encrypted data is generally a random data string, and because this notation can be complex, an alphabet character string will be used in this specification for the sake of convenience. Here, the result of encrypting "Suzuki Ichiro" will be assumed to be "zdsiukiio." Next, if "Suzuki Ichiro" is entered as input from the user as the retrieval keyword, this entered input "Suzuki Ichiro" is encrypted to generate the encrypted retrieval keyword "zdsiukiio,". This encrypted retrieval keyword "zdsiukiio" is collated with the encrypted keywords in the index, and the name "file A" is extracted. This method is referred to hereinbelow as the second method of the prior art.

The first method of the prior art entails some security risks because decrypted data are in the database.

In contrast, although the second method of the prior art ensures confidentiality of data in the files because retrieval is performed with data in an encrypted state, retrieving data in its encrypted state severely limits the types of retrieval that can be performed.

When retrieving information regarding an individual, for example, the full name that specifies the individual may in some cases be used as the retrieval keyword, but in other cases, the individual's family name alone may also be used as the retrieval keyword. Although a complete-match retrieval is possible when the key item of the encrypted file is the full name and the full name is encrypted, a partial-match retrieval cannot be performed when the family name is used as the retrieval key. For example, if the full name is "Suzuki Ichiro," the encrypted data of the family name "Suzuki" is not included in the encryption "zdsiukiio" of the entire name.

As another example, when retrieving personal information, a case can be considered in which numerical information such as age is used as the retrieval key and persons older than a particular age are to be retrieved.

However, it cannot be guaranteed that the original relation between ages 40 and 20 can be maintained in encrypted data of ages 40 and 20, and retrieval under these conditions cannot be performed.

SUMMARY OF THE INVENTION

The present invention was achieved in view of these problems of the prior art and has as its object the capability for various types of retrieval from an encrypted file while maintaining security.

The encrypted file retrieval method of the present invention is a method of retrieving an encrypted file that is constituted by an assemblage of records having a plurality of items (record fields), and moreover, wherein at least a key item among the plurality of items that is an encrypted retrieval key item, the encrypted file retrieval method including:

Step a for decrypting at least key items of each record, attaching identifiers that indicate to which records the key items belong, and expanding the decrypted key items and identifiers in a main memory; and Step b for retrieving key items that satisfy retrieval conditions from key items that have been expanded in the main memory.

In addition, Step a includes steps of:

reserving a work area in the main memory;

decrypting at least the key items in each record, attaching identifiers that indicate to which record the key items belong, and expanding the decrypted key items and identifiers in the reserved work area; and releasing the work area when a series of retrieval processes has been completed.

Step b further includes a step of:

reading and decrypting appropriate records from an encrypted file based on identifiers that are attached to key items that satisfy retrieval conditions and including the decrypted records in retrieval results.

The encrypted file retrieval device of the present invention is a device for retrieving an encrypted file that is constituted by an assemblage of records having a plurality of items wherein at least a key item among the plurality of items that is an encrypted retrieval key item; the encrypted file retrieval device including:

an expansion means for decrypting at least key items in each record, attaching identifiers that indicate to which records the key items belong, and expanding the decrypted key items and the identifiers in the main memory; and a retrieval means for retrieving key items that satisfy retrieval conditions from key items that have been expanded in the main memory.

In addition, the expansion means includes: means for reserving a work area in the main memory; means for decrypting at least key items in each record, attaching identifiers that indicate to which records the key items belong, and expanding the decrypted key items and identifiers in the reserved work area; and means for releasing the work area upon completion of a series of retrieval processes. The retrieval means has a constitution for reading and decrypting appropriate records from art encrypted file based on the identifiers that are attached to key items that satisfy retrieval conditions and including the decrypted records in the retrieval results.

Unlike an external memory devices such as magnetic disk devices, a computer's main memory typically cannot be directly accessed from the outside, and security can be maintained while at least key items of each record in an encrypted file are decrypted and expanded in the main memory.

Problems regarding severe restrictions on the types of retrieval can be solved because key items that satisfy retrieval conditions are retrieved using the decrypted key items.

The above and other objects, features, and advantages of the present invention will become apparent from the following description based on the accompanying drawings which illustrate examples of preferred embodiments of the present invention.

DETAILED DESCRIPTION OF THE PREFERRED EMBODIMENTS

A detailed explanation regarding the embodiments of the present invention is next presented with reference to the accompanying drawings.

Figure 1:
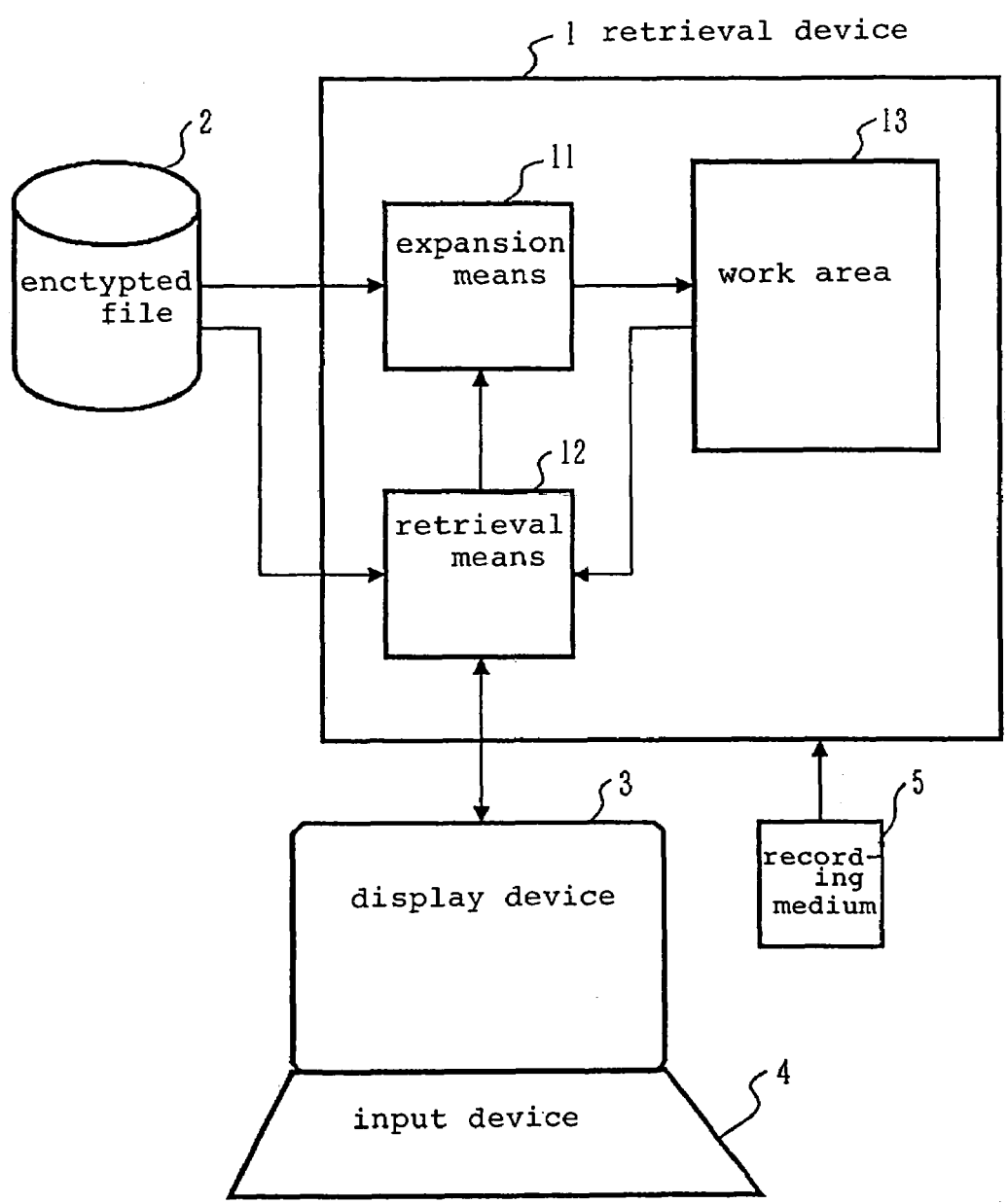
FIG. 1 is a block diagram showing an example of an encrypted file retrieval device of the present invention.

Referring first to FIG. 1, there is shown a block diagram showing an example of the encrypted file retrieval device of the present invention, the device being made up by retrieval device 1, encrypted file 2, display device 3 and input device 4.

Figure 2:
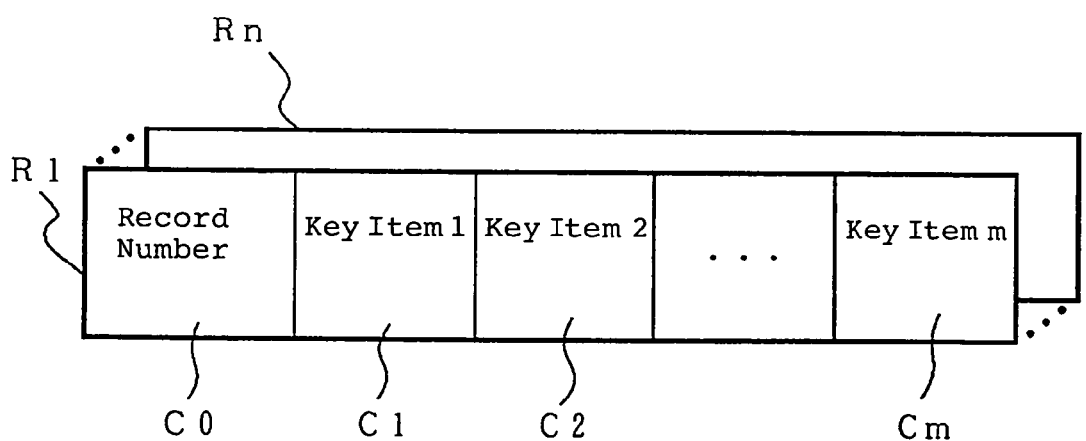
FIG. 2 shows an example of the content of an encrypted file in a working example of the present invention.

Encrypted file 2 is constituted by an assemblage of records R1-Rn having a plurality of items C0-Cm, such as shown in FIG. 2. Each of records R1-Rn, for example, corresponds to a specific person and holds various types of information regarding this person. For example, item C1 indicates the full name, item C2 indicates age, and item Cm indicates annual income. Other items store various data such as the individual's work position or department. In addition, the record number of item C0 is a record identifier for uniquely identifying the record. In each of records R1-Rn, at least the key item that is the retrieval key is encrypted. For the sake of simplifying the explanation, it is here assumed that item C1 and item C2 are the retrieval key items, and that only item Cm of items other than the key items is encrypted. In other words, of items C0-Cm, items C1, C2 and Cm are encrypted, and the remaining items are not encrypted. In addition, the method of encryption is not particularly restricted, and any encryption method may be adopted.

Display device 3 and input device 4 are the interfaces between the user and retrieval device 1, and the user applies as input, for example, instructions from input device 4 to activate or halt the operation of retrieval device 1 as well as retrieval conditions. Display device 3 is used for displaying to the user the retrieval results that have been obtained by retrieval device 1.

Retrieval device 1 is a device for retrieving from encrypted file 2 those records that match the retrieval conditions that have been applied as input from the user and presenting these records to the user, and is constituted by expansion means 11, retrieval means 12, and work area 13. Retrieval device 1 is constituted by a central processing unit that constitutes a personal computer or workstation server, a main memory, and a control program. In this case, the control program is stored on a mechanically readable recording medium 5 such as a CD-ROM, semiconductor memory, or magnetic disk; is read by the computer, for example, when starting up the computer that constitutes retrieval device 1; and realizes expansion means 11 and retrieval means 12 on the computer by controlling the operation of the computer.

Expansion means 11 is a means for decrypting the key items of each of the records R1-Rn of encrypted file 2; attaching identifiers that indicate the record to which the key items belong, and expanding the decrypted key items and identifiers in the main memory. In this embodiment, the record numbers of items C0 of each of records R1-Rn are used as the identifiers. In addition, the decryption keys that are necessary for decryption are set by expansion means 11.

Figure 3:
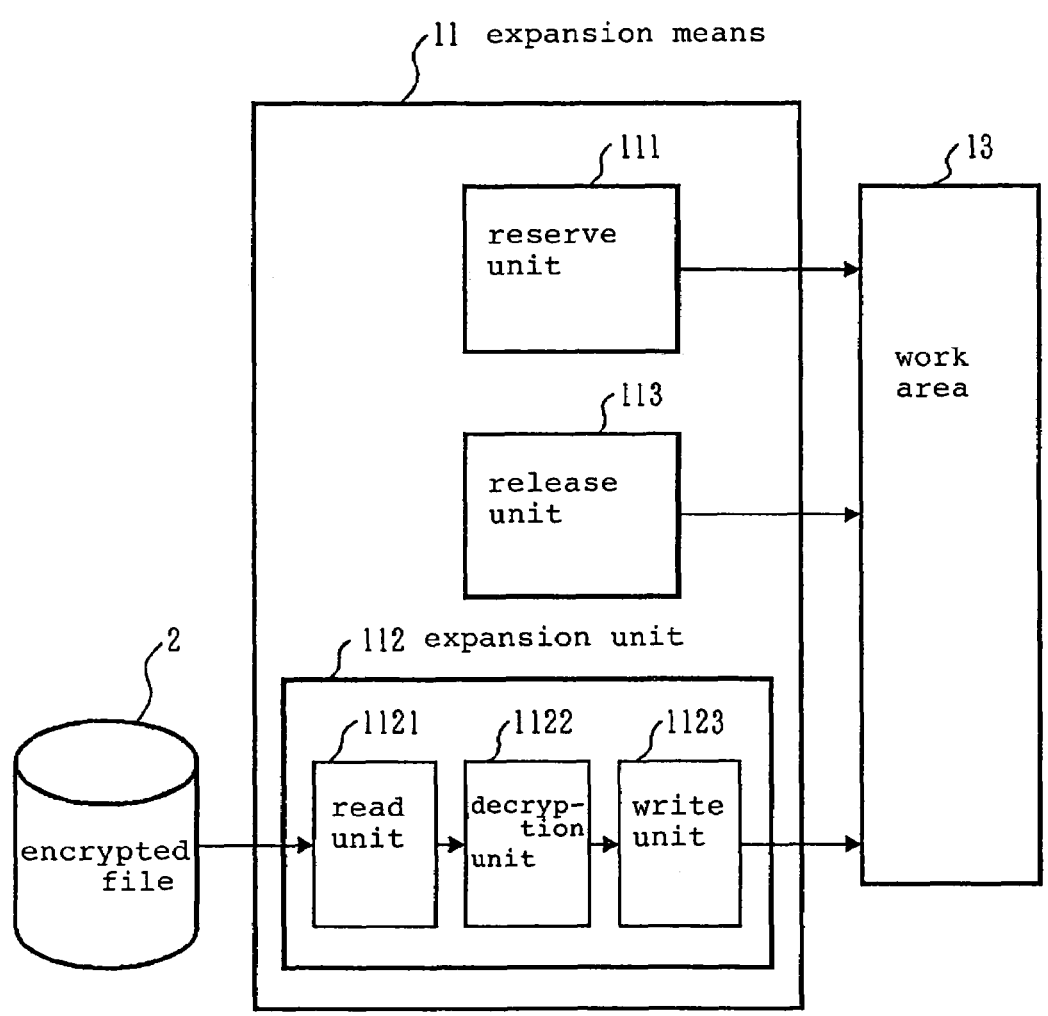
FIG. 3 is a block diagram showing an example of the construction of the expansion means in a working example of the present invention.

An example of the constitution of expansion means 11 is shown in FIG. 3. This example of expansion means 11 includes: reserve unit 111 for reserving work area 13 in the main memory upon start-up of retrieval device 1; expansion unit 112 for decrypting key items C1 and C2 of each of records R1-Rn of encrypted file 2, attaching record number C0, and storing in work area 13; and release unit 113 for releasing work area 13 when shutting down retrieval device 1. Expansion unit 112 is made up by: read unit 1121 for reading key items C1 and C2 of each of records R1-Rn from encrypted file 2; decryption unit 1122 for decrypting key items C1 and C2 that have been read; and write unit 1123 for writing key items C1 and C2 that have been decrypted and record number C0 as a single record in work area 13.

Figure 4:
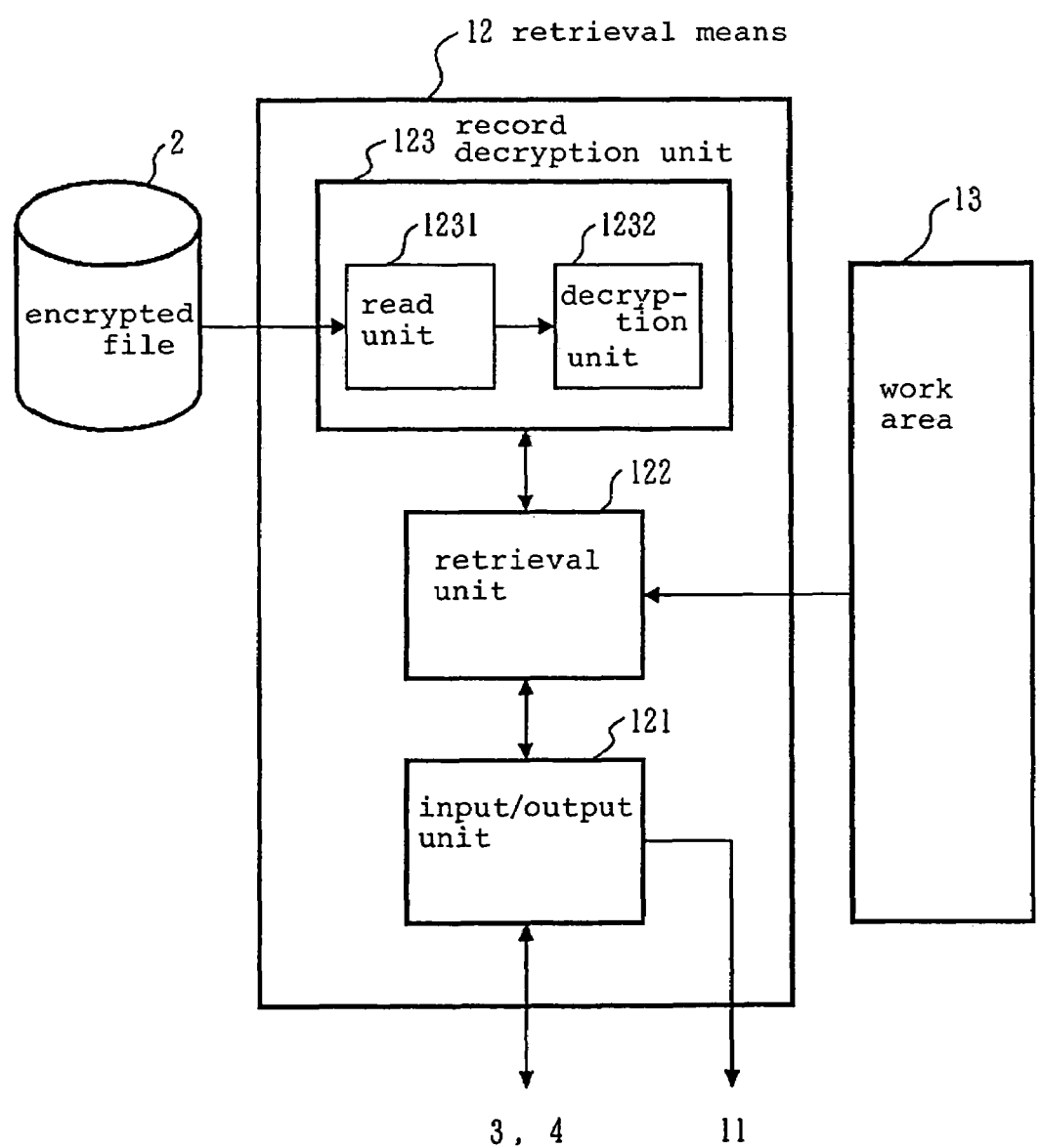
FIG. 4 is a block diagram showing an example of the configuration of the retrieval means in a working example of the present invention.

Retrieval means 12 is a means for retrieving from the group of records in work area 13 those key items that satisfy retrieval conditions that have been applied as input from the user. FIG. 4 shows an example of the constitution of retrieval means 12. Retrieval means 12 of this example includes: input/output unit 121 for exchanging data of display device 3 and input device 4; retrieval unit 122 for realizing a retrieval process according to the retrieval conditions that have been applied as input by way of input/output unit 121; and record decryption unit 123 for reading and decrypting records from encrypted file 2 in accordance with the request from retrieval unit 122. In addition, record decryption unit 123 is constituted by read unit 1231 for reading records from encrypted file 2 and decryption unit 1232 for decrypting those items among the read records that have been encrypted. Decryption keys that are necessary for decryption are assumed to be set in retrieval means 12.

Figure 5:
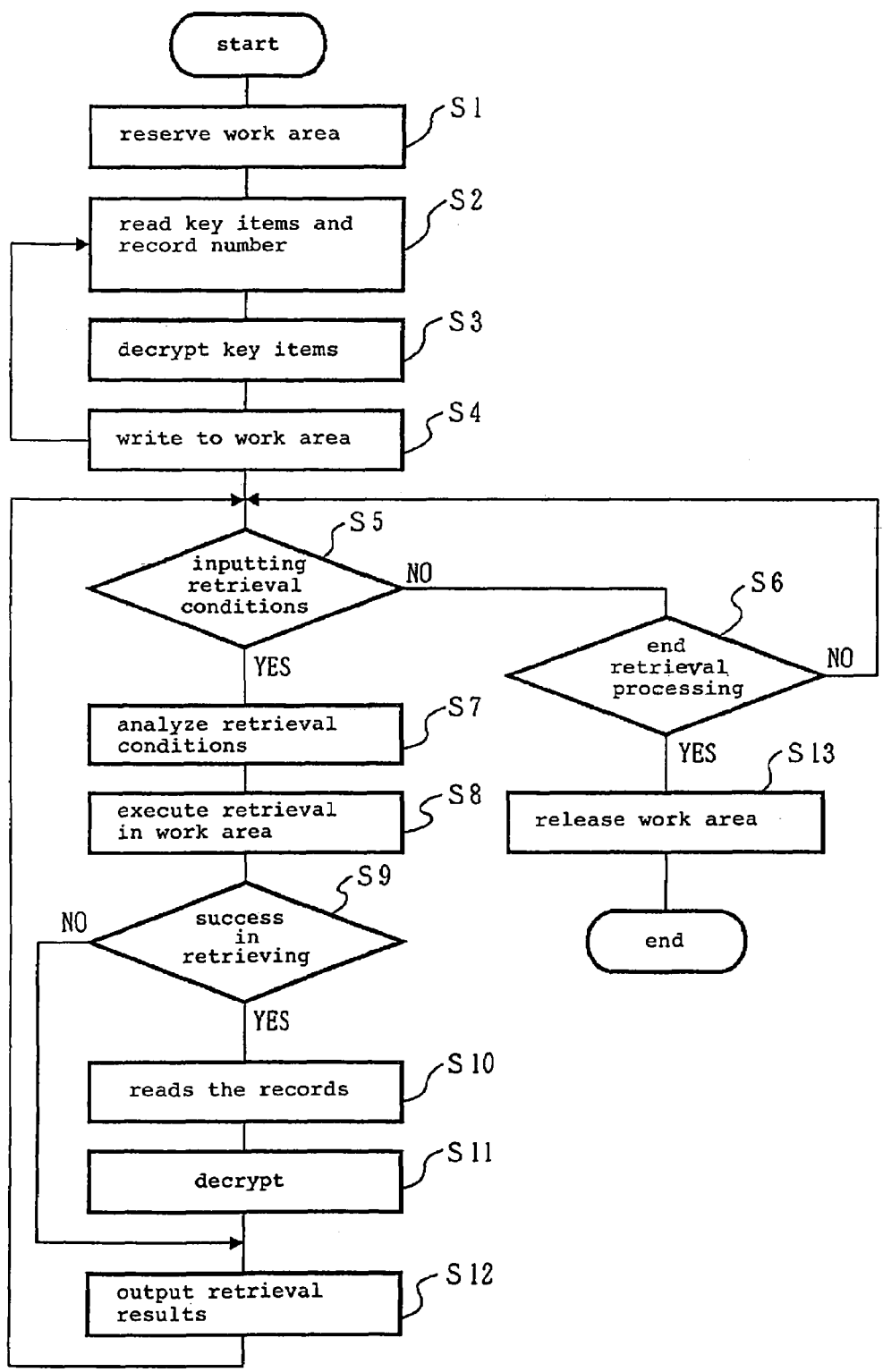
FIG. 5 is a flow chart showing an example of the processing of a working example of the retrieval device of the present invention.

We now refer to FIG. 5, in which is shown a flow chart showing an example of the processing of retrieval device 1. The operation of this embodiment is next described with reference to each of the figures.

Figure 6:
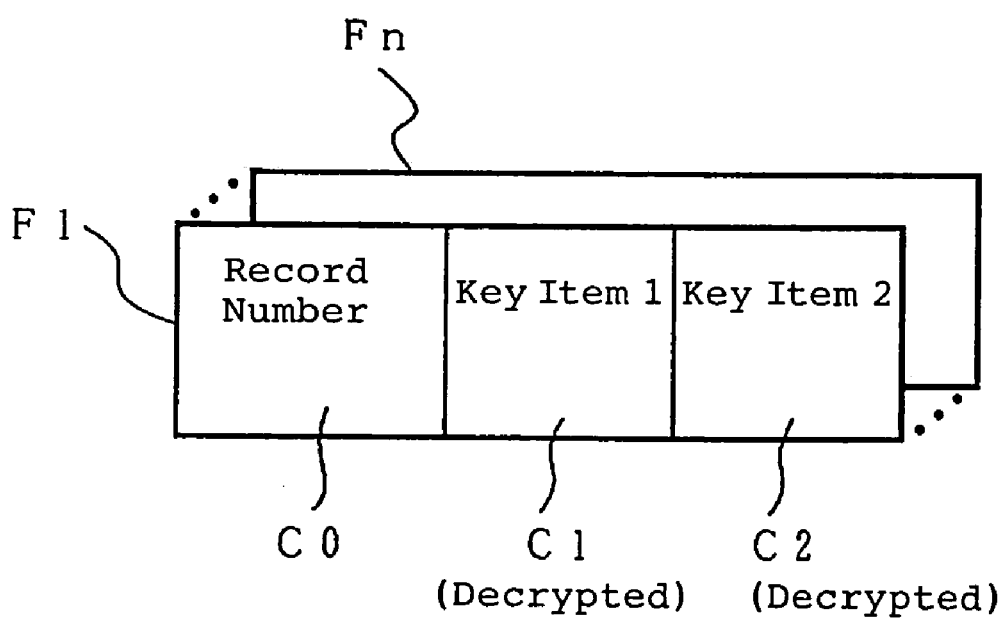
FIG. 6 shows an example of the content of the work area in the working example of the present invention.

Upon activation from the user by way of input device 4, retrieval device 1 activates expansion means 11. Expansion means 11 first reserves work area 13 from the main memory by means of reserve unit 111 (S1 in FIG. 5). Expansion means 11 then reads retrieval key items C1 and C2 and record number C0 of leading record R1 of encrypted file 2 by means of read unit 1121 of expansion unit 112 (S2); decrypts retrieval key items C1 and C2 by means of decryption unit 1122 (S3), and writes decrypted key items C1 and C2 and record number C0 to work area 13 as one record (S4). The processes of these steps S2-S4 are repeated for the remaining records R2-Rn in encrypted file 2, whereby records F1-Fn having a one-to-one correspondence to each of records R1-Rn in encrypted file 2 are stored in work area 13 as shown in FIG. 6. At this point, items C1 and C2 in records F1-Fn are in a decrypted state.

When the above-described processing by expansion means 11 has been completed, control passes to retrieval means 12. Input/output unit 121 of retrieval means 12 waits for instructions from the user (S5 and S6), passes the retrieval conditions to retrieval unit 122 when instructed to execute retrieval that includes retrieval conditions ("YES" in S5), and notifies the end of processing to expansion means 11 when instructed to end retrieval processing ("YES" in S6).

Upon receiving the retrieval conditions, retrieval unit 122 analyzes the retrieval conditions (S7) and executes the required retrieval in work area 13 (S8). For example, if, as the retrieval conditions, one retrieval key is designated and retrieval is designated of records in which prescribed key items have the same value as this retrieval key; retrieval unit 122 retrieves from among records F1-Fn in work area 13 those records in which the key items have the same value as the retrieval key and extracts the corresponding record numbers C0. Alternatively, if, as the retrieval conditions, one retrieval key is designated and the retrieval is designated of records in which prescribed key items have a value that is equal to or greater than the retrieval key, retrieval unit 122 retrieves from among records F1-Fn in work area 13 those records in which the key items have values that are equal to or greater than the retrieval key and extracts the accompanying record numbers C0. Retrieval is similarly executed for retrieval instructions in which a plurality of retrieval keys are designated by an AND condition.

In the case of success in retrieving at least one record in work area 13 ("YES" in S9), retrieval unit 122 passes the obtained record numbers C0 to record decryption unit 123. Read unit 1231 of record decryption unit 123 reads the records having the reported record numbers C0 from encrypted file 2 (S10), decryption unit 1232 decrypts encrypted items C1, C2, and Cm in that record (S11), and returns the decrypted items to retrieval unit 122. Retrieval unit 122 outputs these decrypted records as the retrieval results to display device 3 by way of input/output unit 121 (S12). In the event of failure to retrieve records ("NO" in S9), retrieval unit 122 outputs the retrieval result that no records exist to display device 3 by way of input/output unit 121 (S12).

When the user completes a series of retrievals and applies as input an instruction to end retrieval from input device 4, this instruction is reported to expansion means 11 by way of input/output unit 121 ("YES" in S6). Upon receiving this notification, expansion means 11 releases work area 13 by means of release unit 113 (S13) Records F1-Fn that were expanded in work area 13 are thus erased.

Figure 7:
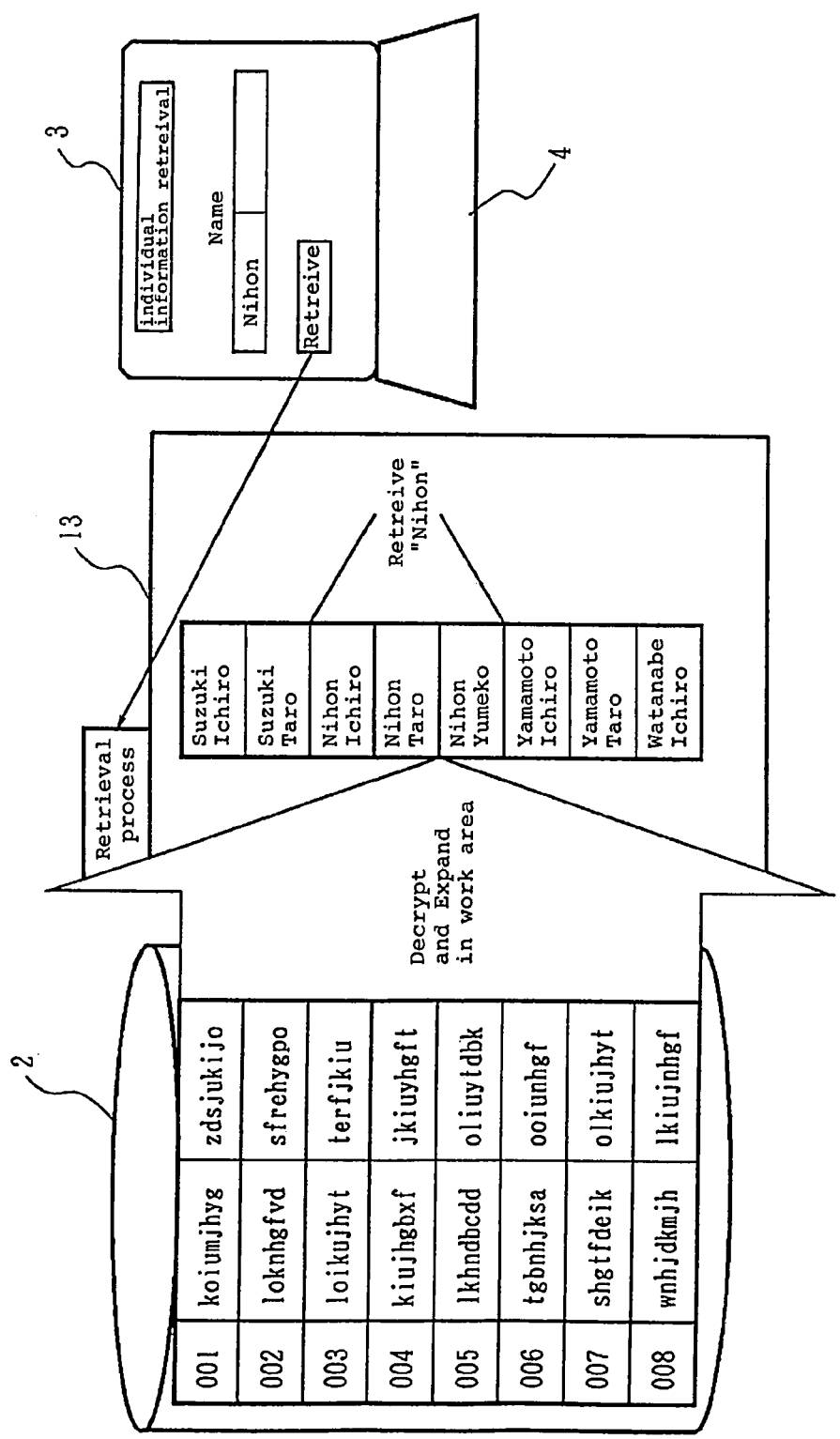
FIG. 7 gives a schematic representation of the states of retrieval processing by the retrieval device in the working example of the present invention.

FIG. 7 gives a schematic representation of the states of the retrieval process in retrieval device 1. Retrieval key items of each record of encrypted file 2 are decrypted and expanded in work area 13 of the main memory. The example shown in the figure is for a case in which the key item is the full name of an individual. As the retrieval key, the user omits the personal name and enters only the family name "Nihon" of the full name into an individual information retrieval screen of display device 3, and instructs retrieval. In this case, retrieval device 1 performs a partial-match retrieval of key items that contain "Nihon" among the key items of full names that are expanded in work area 13. If corresponding records are found, retrieval device 1 reads and decrypts the original records from encrypted file 2 and displays the retrieval results on display device 3, as described in the foregoing explanation.

Although only the retrieval key items of each record of encrypted file 2 are decrypted and only the decrypted key items and identifiers that indicate to which records the key items belong are expanded in the main memory in the above-described embodiment, items other than the key items of each record may be decrypted (if in an encrypted state) and expanded in the main memory. Further, although record numbers belonging to each record of encrypted file 2 were used as the identifiers that indicate to which records the key items belong, any other method may be adopted as long as the correspondence between records that have been expanded in the main memory and the records among encrypted files is clear. Still further, although it was assumed that keys that are necessary for decryption were determined in advance by the encrypted file retrieval device itself in the above-described embodiment, a constitution is also possible in which the keys are held and managed outside the encrypted file retrieval device and used by the encrypted file retrieval device when necessary, or in which the retriever of records enters the key as input to the device.

As described in the foregoing explanation, the present invention proposes decryption of at least key items of each of the records of an encrypted file, attachment of identifiers that indicate the records to which the key items belong, expansion in the main memory, and retrieval of key items that satisfy retrieval conditions from the key items that have been expanded in the main memory, and therefore has the effect of enabling various types of retrieval of encrypted files while maintaining security.

While a preferred embodiments of the present invention has been described using specific terms, such description is for illustrative purposes only, and it is to be understood that changes and variations may be made without departing from the spirit or scope of the following claims.

What is claimed is:

1. A file retrieval method of retrieving records that satisfy retrieval conditions from an at least partly encrypted file, said file retrieval method comprising the steps of:

A) in a file comprising an assemblage of records, each record having a record number and plural encrypted and unencrypted fields which make up database information fields, and at least one field among said plurality of fields being an encrypted retrieval key, decrypting the encrypted retrieval keys in each record, attaching identifiers to the decrypted retrieval keys to indicate to which records the decrypted retrieval keys belong, and expanding said decrypted keys and said identifiers in a main memory, remaining fields of each record not being retrieved from the file and expanded into the main memory; and B) after making a test of each decrypted retrieval keys for satisfying retrieval conditions, retrieving, from the file, the remaining fields of records with decrypted retrieval keys that satisfy the retrieval conditions.

2. A file retrieval method according to claim 1, wherein said step A) comprises the steps of:
reserving a work area in said main memory;
decrypting the encrypted retrieval keys in each record;
attaching the identifiers that indicate to which records the decrypted retrieval keys belong; and
expanding said decrypted retrieval keys and said identifiers in said reserved work area; and
releasing said work area when a series of retrieval processes has been completed.

3. A file retrieval method according to claim 1, wherein said step B) further comprises a step of:
reading and decrypting appropriate records from the file based on the identifiers that are attached to the expanded, decrypted keys that satisfy retrieval conditions and including said decrypted records in retrieval results.

4. A file retrieval method according to claim 2, wherein said step B) further comprises a step of:
reading and decrypting appropriate records from the file based on the identifiers that are attached to the expanded, decrypted keys that satisfy retrieval conditions and including said decrypted records in retrieval results.

5. A file retrieval device for retrieving records that satisfy retrieval conditions from a file, said file retrieval device comprising:
an expansion means for processing a file comprising an assemblage of records, each record having a record number and plural encrypted and unencrypted fields which make up database information fields, and at least one field among said plurality of fields being an encrypted retrieval key, and for decrypting the encrypted retrieval keys in each record, attaching identifiers to the decrypted retrieval keys to indicate to which records the decrypted retrieval keys belong, and expanding said decrypted keys and said identifiers in a main memory, the remaining items of each record not being expanded into the main memory; and
a retrieval means for retrieving, from the file, the remaining fields of records with decrypted retrieval keys that satisfy retrieval conditions.

6. A file retrieval device according to claim 5, wherein said expansion means comprises:
means for reserving a work area in the main memory;
means for decrypting the encrypted retrieval keys in each record, attaching the identifiers, that indicate to which records the decrypted retrieval keys belong, and expanding said decrypted retrieval keys and said identifiers in said reserved work area; and
means for releasing said work area upon completion of a series of retrieval processes.

7. A file retrieval device according to claim 5, wherein said retrieval means comprises a constitution for reading and decrypting appropriate records from the file based on said identifiers that are attached to the expanded, decrypted keys that satisfy retrieval conditions and including said decrypted records in retrieval results.

8. A file retrieval device according to claim 6, wherein said retrieval means comprises a constitution for reading and decrypting appropriate records from the file based on said identifiers that are attached to the expanded, decrypted keys that satisfy retrieval conditions and including said decrypted records in retrieval results.

9. A computer-readable recording medium on which is recorded a program for causing a computer, which constitutes a device for retrieving a file, to perform the functions of:
an expansion means for processing a file comprising an assemblage of records, each record having a record number and plural encrypted and unencrypted fields which make up database information fields, and at least one field among said plurality of fields being an encrypted retrieval key, and for decrypting the encrypted retrieval keys in each record, attaching identifiers that indicate to which records the decrypted retrieval keys belong, and expanding said decrypted retrieval keys and said identifiers in a main memory; and
a retrieval means for retrieving remaining fields from the records having expanded, decrypted retrieval keys that satisfy retrieval conditions.

10. A computer-readable recording medium according to claim 9, wherein said expansion means comprises:
means for reserving a work area in the main memory;
means for decrypting the encrypted retrieval keys in each record, attaching identifiers that indicate to which records the decrypted retrieval keys belong, and expanding said decrypted retrieval keys and said identifiers in said reserved work area; and
means for releasing said work area upon completion of a series of retrieval processes.

11. A computer-readable recording medium according to claim 9, wherein said retrieval means comprises a constitution for reading and decrypting appropriate records from the file based on said identifiers that are attached to the retrieval keys that satisfy retrieval conditions and including said decrypted records in retrieval results.

12. A computer-readable recording medium according to claim 10, wherein said retrieval means comprises a constitution for reading and decrypting appropriate records from the file based on said identifiers that are attached to the retrieval keys that satisfy retrieval conditions and including said decrypted records in retrieval results.

* * * * *